(12) United States Patent
Lee

(10) Patent No.: US 7,257,054 B2
(45) Date of Patent: Aug. 14, 2007

(54) OPTICAL RECORDING/REPRODUCING APPARATUS

(75) Inventor: Dong-Woo Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 567 days.

(21) Appl. No.: 10/807,337

(22) Filed: Mar. 24, 2004

(65) Prior Publication Data

US 2004/0190401 A1    Sep. 30, 2004

(30) Foreign Application Priority Data

Mar. 25, 2003    (KR) .................... 10-2003-0018530

(51) Int. Cl.
*G11B 7/00*    (2006.01)

(52) U.S. Cl. ................. 369/44.32; 369/44.14; 720/674

(58) Field of Classification Search ............ None
See application file for complete search history.

(56) References Cited

U.S. PATENT DOCUMENTS 6,385,160 B1 *    5/2002    Jeon .................... 720/675
6,874,154 B2 *    3/2005    Inoue et al. ............... 720/675
6,912,722 B2 *    6/2005    Arase .................... 720/674
6,971,115 B2 *    11/2005    Kojima et al. ............ 720/675
2004/0028394 A1 *    2/2004    Park et al. ............... 386/125
2004/0052199 A1 *    3/2004    Nakashima et al. ........ 369/249

FOREIGN PATENT DOCUMENTS

JP    2000020962 A *    1/2000

* cited by examiner

*Primary Examiner*—Thang V. Tran
(74) *Attorney, Agent, or Firm*—Birch, Stewart, Kolasch & Birch, LLP

(57) ABSTRACT

An optical recording/reproducing apparatus includes an optical pickup recognizing information of an optical disc; a main shaft and a sub-shaft oppositely installed on a base plate, for supporting the optical pickup; a fixing portion for movably supporting one end of the main shaft; a support portion installed on the base plate at a certain distance from the fixing portion, for elastically supporting the other end of the main shaft; a prop portion installed on the base plate, for supporting a bottom middle surface of the main shaft; and a skew adjustment screw rotatably installed at the base plate, for upwardly pushing an end of the main shaft supported by the support portion.

19 Claims, 5 Drawing Sheets

OPTICAL RECORDING/REPRODUCING APPARATUS

This Non-provisional application claims priority under 35 U.S.C. 119(a) on Patent Application No(s). 10-2003-0018530 filed in Korea on Mar. 25, 2003, the entire contents of which are hereby incorporated by reference.

BACKGROUND OF THE INVENTION

1. Field of the Invention

The present invention relates to an optical recording/reproducing apparatus, and particularly, to an optical recording/reproducing apparatus capable of adjusting a skew of an optical pickup within a range that the optical pickup can accurately recognize an optical disc.

2. Description of the Background Art

Recently, mobile communication devices such as a personal information terminal, a picture phone or the like have been generalized according to development of a multimedia environment, popularization of a personal computer and generalization of a data transmission network and advancement of a wireless communication technology. Such generalization of mobile communication devices has brought about a considerable increase in a capacity of information to be processed and stored in those devices.

In order to cope with the situation, researches are ongoing to increase a record density of an optical recording medium such as a CD or a DVD, in crease a resolution of an optical pickup unit and implement small optical components.

Since the advent of an early optical recording/reproducing apparatus for a CD-ROM, an optical disc has been improved to obtain a rapid access speed and high density and as a result, a large capacity of optical disc has been developed, which can reproduce simple information and also can record information.

An optical recording/reproducing apparatus for recording and reproducing an optical disc requires a high level of signal processing techniques. Especially, reducing a slant error, that is, a skew error between an optical axis of an optical pickup and the optical disc is required as a core technique for accomplishing accuracy in recording/reproducing information.

In the optical recording/reproducing apparatus requiring the advanced signal processing technique, if a skew error occurs since an optical beam of the optical pickup is not accurately made incident vertically on a signal record face of the optical disc, that is, if a skew error occurs, a signal is distorted and thus the signal cannot be accurately processed.

Because a fine assembly error occurs due to a tolerance of the optical disc and smoothness of a mounting surface of a spindle motor installed at a base plate supporting the optical pickup, even after the optical pickup is assembled at the base plate, adjustment of a skew of an optical pickup (adjustment of a tilt of an optical pickup) should be necessarily performed.

In order to reduce a skew, development of an optical pickup skew adjustment unit capable of mechanically adjusting the optical pickup skew adjustment unit is considered as the most effective way to improve a signal processing performance.

FIG. 1 is a plane view showing a conventional optical recording/reproducing apparatus.

As shown in FIG. 1, a conventional optical recording/reproducing apparatus 1 includes a spindle motor 20 installed on a base plate 10, a turn table 40 rotatably installed on the spindle motor 20, for mounting an optical disc 30 thereon; an optical pickup 50 installed on the base plate 10, for irradiating an optical beam irradiated from an optical system (not shown) to a surface of the optical disc 30; a main shaft 60 installed on the blase plate 10, for supporting one side of the optical pickup; a sub-shaft 70 positioned parallel with the main shaft 60 at a certain distance therebetween and installed on the blase plate 10, for supporting the other side of the optical pickup 50.

Arms 51 are respectively formed at both sides of the optical pickup 50 in order to couple the optical pickup 50 itself to the main shaft 61 and the sub-shaft 70.

Skew adjustment units 80 for adjusting a skew are respectively installed at both ends of the sub-shaft 70 and one end of the main shaft 60, and a fixing unit 90 is installed at the other end of the main shaft 60.

In the skew adjustment unit 80, a support portion 82 having a spring 81 is formed on the base plate 10, a screw hole 82a is formed at an upper portion of the support portion 82, and a skew adjustment screw 83 is threaded to the screw hole 82a.

One end of the main shaft 60 is inserted in an insertion hole 82b formed at the side of the support portion 82 and supported by the spring 81. The other end of the main shaft 60 is rotatably coupled to a fixing unit 90 by a hinge 91.

When the optical recording/reproducing apparatus constructed as above adjusts a skew of the optical pickup 50, one of the four ends of the main shaft 60 and the sub-shaft 70 is set as a standard, and the skew adjustment screw 83 is rotated to adjust the height, so that an optical axis (S) is accurately vertically made incident to the optical disc 40 and thus a skew is corrected.

However, in the conventional optical recording/reproducing apparatus, if the skew adjustment screw 93 is excessively rotated, a distance (D) between the optical disc 30 and the optical pickup 50 becomes too far. Namely, the optical pickup 50 is so distanced from the optical disc 30 that the optical pickup 50 goes beyond its operation range. Then, the optical pickup 50 cannot read a signal of the optical disc 30 accurately.

SUMMARY OF THE INVENTION

Therefore, an object of the present invention is to provide an optical recording/reproducing apparatus in which an optical pickup accurately recognizes information of an optical pickup and thus reliability of a product can be improved, by performing an optical pickup skew adjustment within a range that the optical pickup can recognize the optical disc.

To achieve these and other advantages and in accordance with the purpose of the present invention, as embodied and broadly described herein, there is provided an optical recording/reproducing apparatus including an optical pickup for recognizing information of an optical disc; a main shaft installed on a base plate supporting one side of the optical pickup; a sub-shaft positioned at a certain distance from the main shaft, installed on the base plate, for supporting the other side of the optical pickup; and an optical pick skew adjustment means installed at least one of the main shaft and the sub-shaft, operating within a range that the optical pickup can recognize the optical disc, for adjusting a skew of the optical pickup.

The optical pickup skew adjustment means includes a fixing portion installed on the base plate, having a groove for movably supporting one end of the main shaft at its side; a support portion for supporting the other end of the main shaft, installed on the base plate at a certain distance from a fixing portion, having an insertion hole at its side to insert an end of the main shaft therein and having an elastic member for elastically supporting the end of the main shaft therein; a prop portion installed on the base plate, for supporting a bottom middle surface of the main shaft; and a skew adjustment screw rotatably installed at the base plate, for upwardly pushing the end of the main shaft supported by the prop portion.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
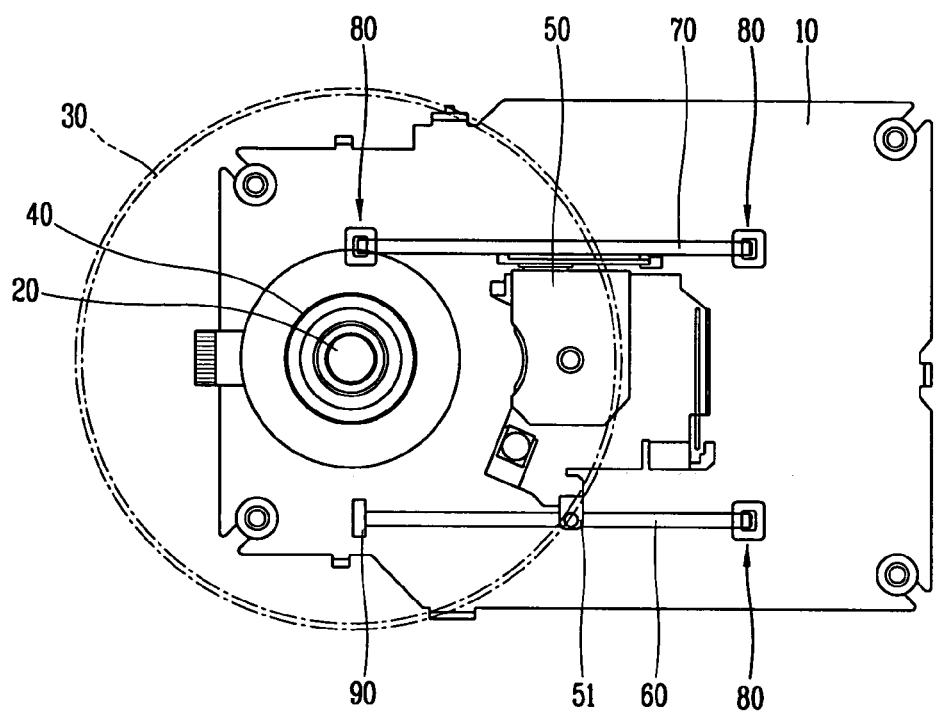
FIG. 1 is a plane view showing a conventional optical recording/reproducing apparatus.
Figure 2:
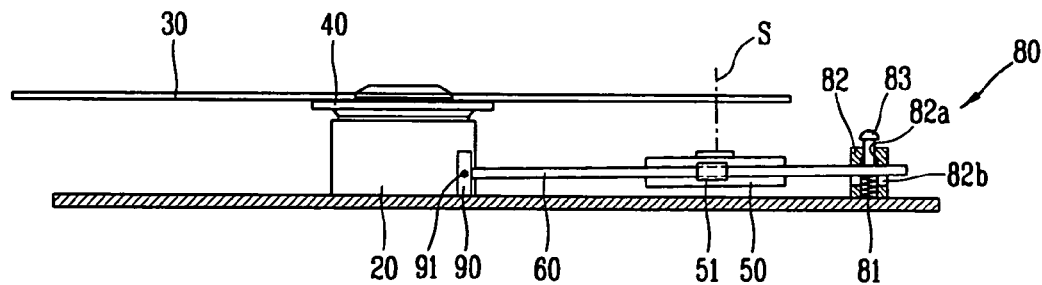
FIG. 2 is a longitudinal sectional view showing a skew of an optical pickup in a conventional optical recording/reproducing apparatus.
Figure 3:
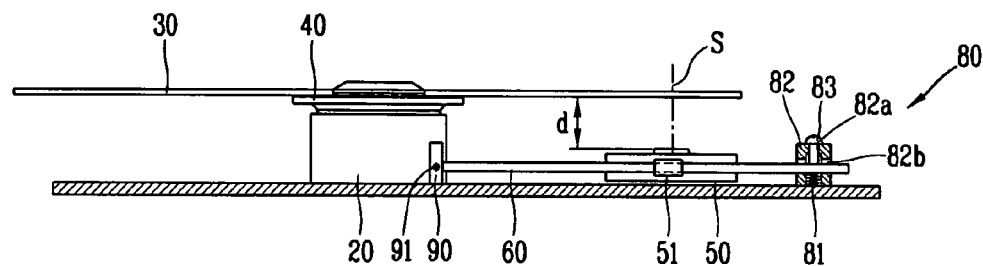
FIG. 3 is a longitudinal sectional view showing correction for a skew of an optical pickup in a conventional optical recording/reproducing apparatus.
Figure 4:
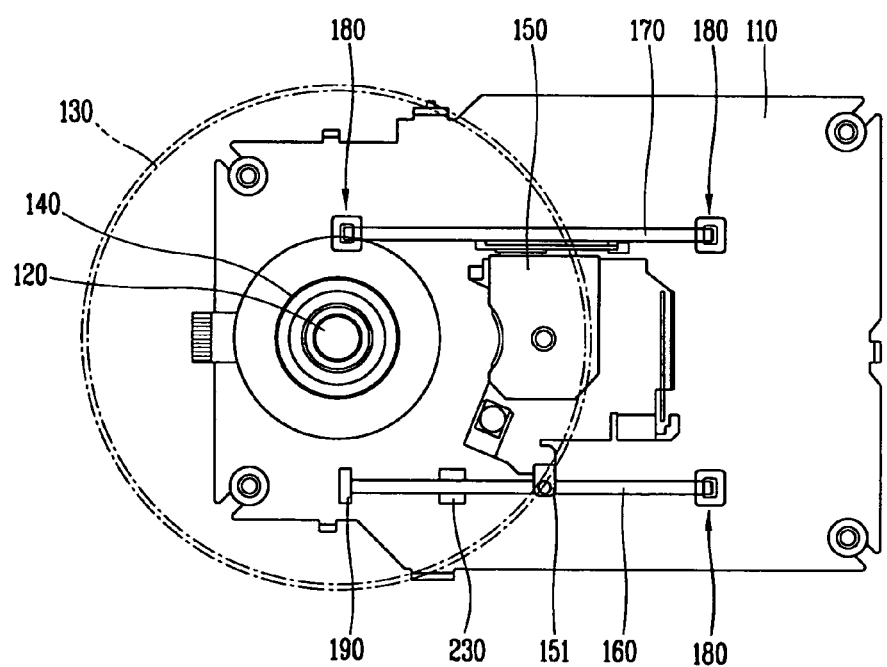
FIG. 4 is a plane view showing an optical recording/reproducing apparatus in accordance with the present invention.
Figure 5:
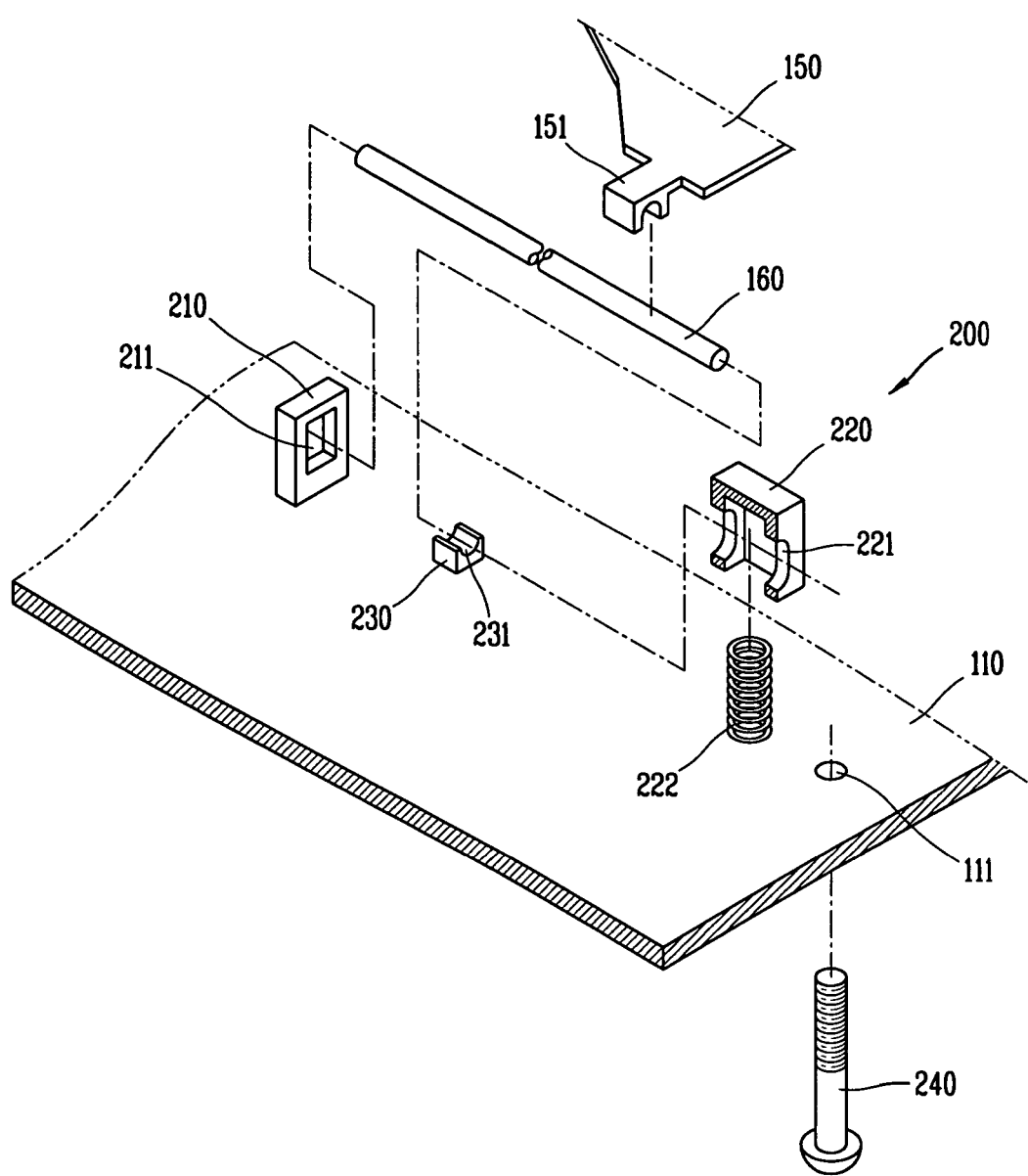
FIG. 5 is a perspective view showing a disassembled optical recording/reproducing apparatus in accordance with the present invention.
Figure 6:
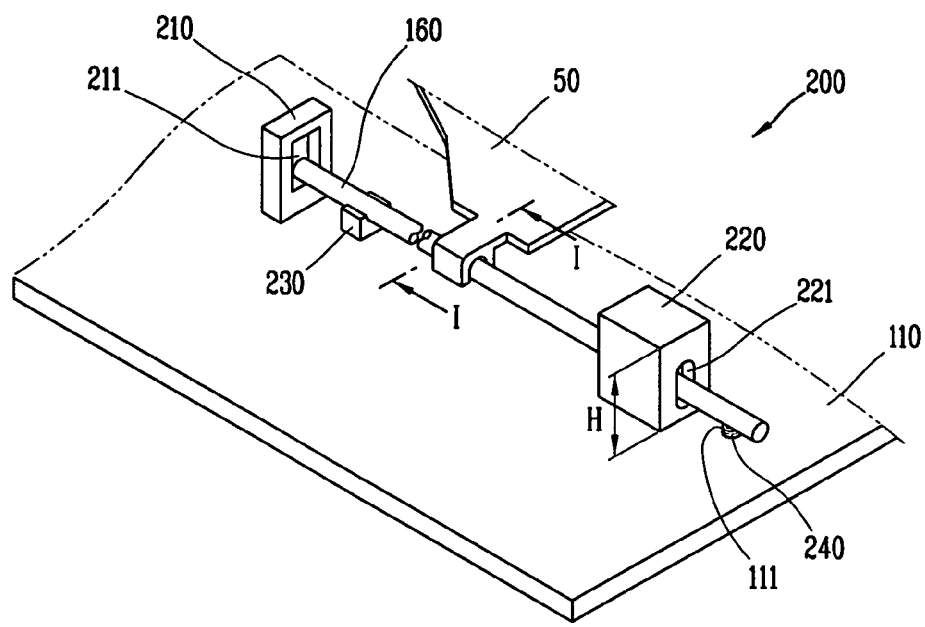
FIG. 6 is a perspective view showing a coupled optical recording/reproducing apparatus in accordance with the present invention.
Figure 7:
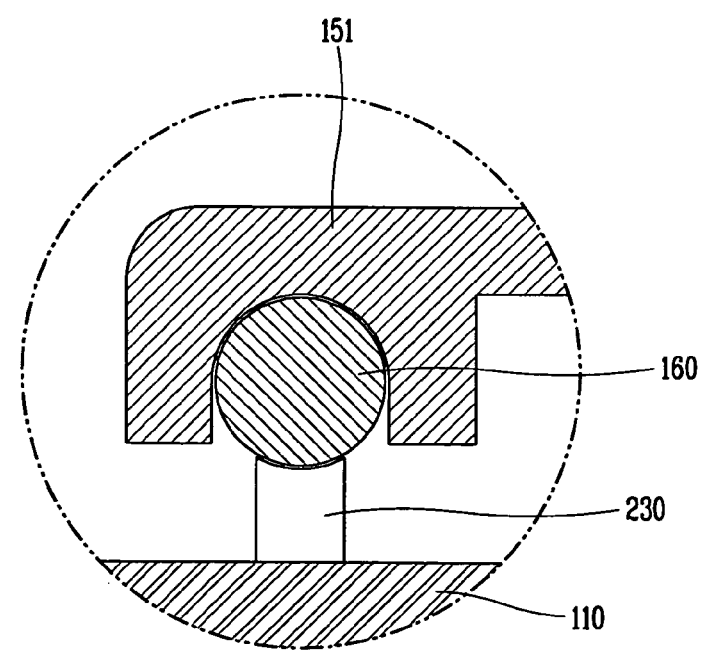
FIG. 7 is a sectional view taken along line I-I of FIG. 6.

FIG. 4 is a plane view showing an optical recording/reproducing apparatus in accordance with the present invention, FIG. 5 is a perspective view showing a disassembled optical recording/reproducing apparatus in accordance with the present invention, FIG. 6 is a perspective view showing a coupled optical recording/reproducing apparatus in accordance with the present invention, and FIG. 7 is a sectional view taken along line I-I of FIG. 6.

As shown therein, an optical recording/reproducing apparatus 100 includes: a spindle motor 120 installed on a base plate 110; a turn table 140 rotatably installed on the spindle motor 120, for mounting an optical disc 130 thereon; an optical pickup 150 installed on the base plate 110, for irradiating an optical beam irradiated from an optical system (not shown) onto a surface of the optical disc 130; a main shaft 160 installed on the base plate, for supporting one side of the optical pickup 150; a sub-shaft 170 positioned parallel with the main shaft 160 at a certain distance therebetween and installed on the base plate 110, for supporting the other side of the optical pickup 150.

Arms 151 are respectively formed at both sides of the optical pickup 150, in order to slidably couple the optical pickup 150 itself to the main shaft 160 and the sub-shaft 170.

An optical pickup skew adjustment means 200 for adjusting a skew is installed at the main shaft 160, and operates within a range that the optical pickup 150 can recognize the optical disc 130.

Hereinafter, a construction of an optical pickup skew adjustment means will now be described.

An optical pickup skew adjustment means 200 includes: a fixing portion 210 installed on a base plate 110 and having a grove 211 for movably supporting one end of the main shaft 160 at its side; a support portion 220, installed on the base plate 110 at a certain distance from the fixing portion and having an insertion hole at its side to insert an end of the main shaft 60 therein and an elastic member 222 for elastically supporting the end of the main shaft 160 therein, for supporting the other end of the main shaft 160; a prop portion 230 installed on the base plate 110, for supporting a bottom middle surface of the main shaft 160; and a skew adjustment screw 240 rotatably installed at a lower surface of the base plate 110, for upwardly pushing the end of the main shaft 160 supported by the support portion 220.

The fixing portion 210 is vertically installed on the base plate 110, and a groove 211 for movably supporting one end of the main shaft 160 is formed at the side of the fixing portion 210. Herein, preferably, the fixing portion 210 is installed by an insert injection molding method.

The support portion 220 is vertically formed on the base plate 110. Herein, preferably, the support portion 220 is formed by an insert injection molding method.

An elastic member 222 installed inside the support portion 220, for example, a compressing spring is installed an upper end inside the support portion, and elastically supports an end of the main shaft 160 downwardly.

A tension spring (not shown) may be installed at a lower end inside the support portion 220 and support an end of the main shaft 160.

Preferably, the insertion hole 221 formed at the side of the support portion 220 has a certain height (H), so that the end of the main shaft 160 is vertically moved.

The prop portion 230 is installed on the base plate 110, supports a bottom middle surface of the main shaft 160, and is positioned between the fixing portion 210 and the support portion 220. Herein, a height of the prop portion 230 is restricted so that the prop portion 230 does not come in contact with the arm 151 of the optical pickup 150 when the optical pickup 150 slides along the main shaft 160 and the sub-shaft 170.

The prop portion 230 has a mounting groove 231 formed in a 'U' shape, for mounting the main shaft 160 and the sub-shaft thereon.

The skew adjustment screw 240 is threaded at a hole 11 of the base plate 110 so as to upwardly push the end portion of the main shaft 160 supported by the support portion 220.

At this time, the skew adjustment screw 240 is installed toward the upper surface from the lower surface of the base plate 110.

In the optical recording/reproducing apparatus in accordance with the present invention constructed as above, the a table 140 rotates an optical disc 130 by a driving force of a spindle motor 120, and simultaneously the optical pickup 150 approaches the optical disc 130 along the main shaft 160 and the sub-shaft 170 by a loading means (not shown). In this state, the optical pickup 150 recognizes information of the optical disc 130, performing an optical recording/reproducing operation.

At this time, if an optical beam of the optical pickup 150 is not accurately vertically made incident onto the optical disc 130, that is a skew occurs, the skew has to be precisely corrected so that the optical pickup 150 can accurately recognize information of the optical disc 130.

Hereinafter, skew adjustment in the optical recording/reproducing apparatus in accordance with the present invention will now be described with reference to FIGS. 8 through 10.

Figure 8:
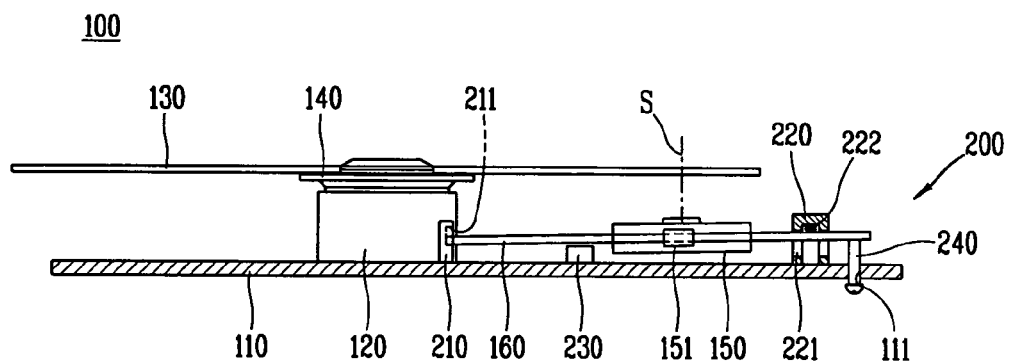
FIG. 8 is a longitudinal sectional view showing a skew of an optical pickup in an optical recording/reproducing apparatus in accordance with the present invention.

FIG. 8 is a longitudinal sectional view showing a skew of an optical pickup in an optical recording/reproducing apparatus in accordance with the present invention. In FIG. 8, an optical axis (S) of the optical pickup 150 is not accurately vertically made incident onto the optical disc 130.

Figure 9:
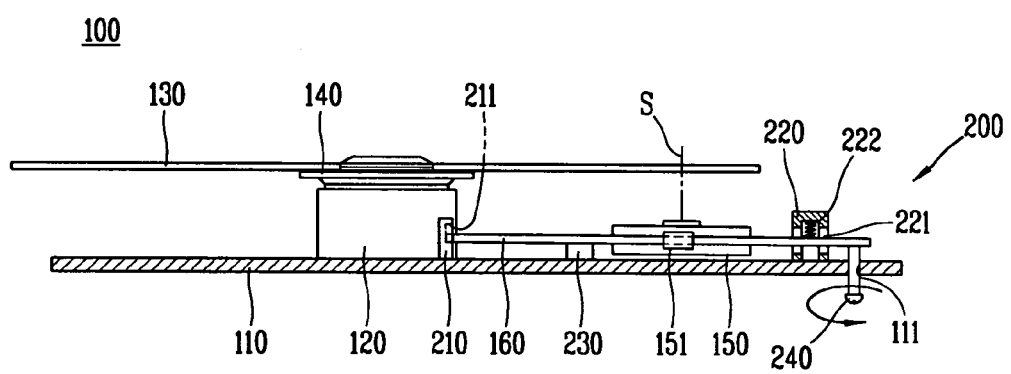
FIG. 9 is a longitudinal sectional view showing first correction for a skew of an optical pickup in an optical recording/reproducing apparatus in accordance with the present invention.

FIG. 9 is a longitudinal sectional view showing first correction for a skew of the optical pickup in an optical recording/reproducing apparatus in accordance with the present invention. As shown therein, if an operator rotates a skew adjustment screw 240 in an arrow direction, the skew adjustment screw 240 threaded at the base plate 110 is released, moving downwardly. At this time, an end of the main shaft 160 (the right of the main shaft in the drawing) goes down by an elastic force of the compressing spring 222, and simultaneously, a bottom middle surface of the main shaft 160 slightly comes in contact with the prop portion 230.

Figure 10:
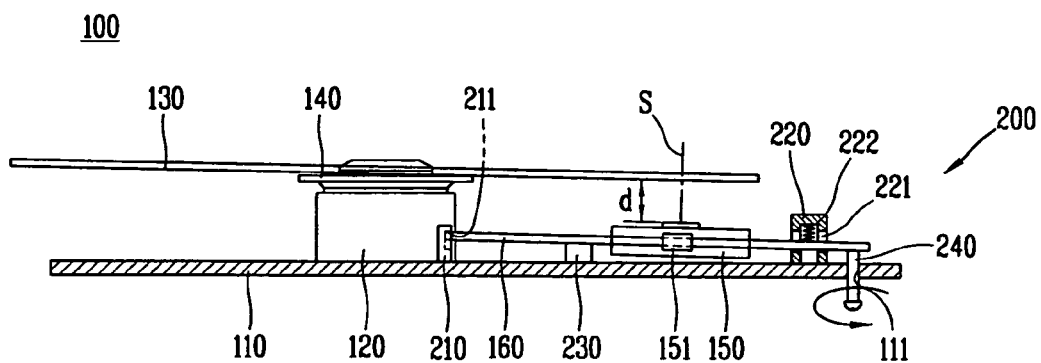
FIG. 10 is a longitudinal sectional view showing second correction for a skew of an optical pickup in an optical recording/reproducing apparatus in accordance with the present invention.

FIG. 10 is a longitudinal sectional view showing second correction of a skew of an optical pickup in an optical recording/reproducing apparatus in accordance with the present invention. As shown therein, if an operator more rotates the skew adjustment screw 240, the skew adjustment screw 240 threaded at the base plate 110 is more released, moving downwardly. At this time, the end of the main shaft 160 (the right of the main shaft in the drawing) more goes down by an elastic force of the compressing spring 222 on the basis of the prop portion 230. At the same time, an end of the main shaft 160 (the left of the main shaft in the drawing) inserted at the groove 211 of the fixing portion 210 moves upwardly to be caught at the upper end of the groove 211. At this time, the bottom middle surface of the main shaft 160 is supported by the prop portion 230, and the optical axis (S) is vertically positioned to the optical disc 130 at a right angle, whereby the skew adjustment is completed.

Even after the adjustment of the skew has been completed, a distance (D) between the optical disc 130 and the optical pickup 150 is within a range that the optical pickup 150 can recognize the optical disc 130.

As so far described, when a skew occurs and so an operator adjusts a skew adjustment screw 240, an end of the main shaft 160 (the right of the main shaft in the drawing) supported by the support portion 220 goes down on the basis of the prop portion 230, and the other end of the main shaft 160 (the left of the main body in the drawing) is restrictively raised in the groove 211 of the fixing portion 210, so that skew adjustment is performed within a range that the optical pickup 150 can recognize the optical disc 130, thus an optical pickup 150 accurately recognize information of the optical disc, and as a result, the reliability of a product can be improved.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An optical recording/reproducing apparatus comprising:
   an optical pickup for recognizing information of an optical disc;
   a main shaft installed on a base plate, for supporting the optical pickup;
   a sub-shaft positioned at a certain distance between itself and the main shaft and installed on the base plate, for supporting the optical pickup; and
   an optical pickup skew adjustment means operating within a range that the optical pickup can recognize the optical disc and installed at at least one of the main shaft and the sub-shaft, for correcting a skew of the optical pickup, the optical pickup skew adjustment means including:
      a fixing portion installed on the base plate and having a groove for movably supporting one end of the main shaft at its side;
      a support portion for supporting the other end of the main shaft, installed on the base plate at a certain distance from the fixing portion, having an insertion hole at its side to insert an end of the main shaft therein and having an elastic member for elastically supporting the end of the main shaft therein;
      a prop portion installed on the base plate, for supporting a bottom middle surface of the main shaft; and
      a skew adjustment screw rotatably installed at the base plate, for upwardly pushing the end of the main shaft supported by the prop portion.

2. The apparatus of claim 1, wherein the elastic member is a coil spring.

3. The apparatus of claim 1, wherein the elastic member is positioned at the upper end inside the support portion so as to downwardly support the end portion of the main shaft.

4. The apparatus of claim 1, wherein the fixing portion, the prop portion and the support portion are installed by an insert injection molding method.

5. The apparatus of claim 1, wherein the height of the prop portion is restrictively formed so that the prop portion does not come in contact with an arm of the optical pickup when the optical pickup slides along the main shaft and the sub-shaft.

6. The apparatus of claim 5, wherein the prop portion has a mounting groove on which the main shaft and the sub-shaft are mounted.

7. The apparatus of claim 6, wherein the mounting groove is formed in a 'U' shape.

8. The apparatus of claim 1, wherein the prop portion is located closer to the fixing portion than the support portion.

9. The apparatus of claim 1, wherein the height of the prop portion is restrictively formed so that the prop portion does not come in contact with an arm of the optical pickup when the optical pickup slides over the prop portion.

10. An optical recording/reproducing apparatus comprising:
- an optical pickup for recognizing information of an optical disc;
- a main shaft installed on a base plate, for supporting the optical pickup;
- a sub-shaft positioned spaced from the main shaft and installed on the base plate, for supporting the optical pickup;
- a prop portion installed on the base plate, for supporting a bottom middle surface of the main shaft, the height of the prop portion being restrictively formed so that the prop portion does not come in contact with an arm of the optical pickup when the optical pickup slides over the prop portion; and
- an optical pickup skew adjustment unit operating within a range that the optical pickup can recognize the optical disc and installed at at least one of the main shaft and the sub-shaft, for correcting a skew of the optical pickup.

11. The apparatus of claim 10, wherein the prop portion has a mounting groove on which the main shaft and the sub-shaft are mounted.

12. The apparatus of claim 11, wherein the mounting groove is formed in a 'U' shape.

13. The apparatus of claim 10, wherein the optical pickup skew adjustment unit includes:
- a fixing portion installed on the base plate and having a groove for movably supporting one end of the main shaft at its side;
- a support portion for supporting the other end of the main shaft, installed on the base plate at a certain distance from the fixing portion, having an insertion hole at its side to insert an end of the main shaft therein; and
- a skew adjustment screw rotatably installed at the base plate, for upwardly pushing the end of the main shaft supported by the prop portion.

14. The apparatus of claim 13, wherein the prop portion is located closer to the fixing portion than the support portion.

15. The apparatus of claim 14, wherein the optical pickup skew adjustment unit includes an elastic member in the support portion for elastically supporting the end of the main shaft therein.

16. The apparatus of claim 15, wherein the elastic member is a coil spring.

17. The apparatus of claim 15, wherein the elastic member is positioned at the upper end inside the support portion so as to downwardly support the end portion of the main shaft.

18. The apparatus of claim 13, wherein the fixing portion, the prop portion and the support portion are installed by an insert injection molding method.

19. An optical recording/reproducing apparatus comprising:
- an optical pickup for recognizing information of an optical disc;
- a main shaft installed on a base plate, for supporting the optical pickup;
- a sub-shaft positioned spaced from the main shaft and installed on the base plate, for supporting the optical pickup;
- a prop portion installed on the base plate, for supporting a bottom middle surface of the main shaft; and
- an optical pickup skew adjustment unit operating within a range that the optical pickup can recognize the optical disc and installed at at least one of the main shaft and the sub-shaft, for correcting a skew of the optical pickup by pivoting the main shaft against the prop portion. hole at its side to insert an end of the main shaft therein and having an elastic member for elastically supporting the end of the main shaft therein;
- a prop portion installed on the base plate, for supporting a bottom middle surface of the main shaft; and
- a skew adjustment screw rotatably installed at the base plate, for upwardly pushing the end of the main shaft supported by the prop portion.

* * * * *